(12) United States Patent
Smith et al.

(10) Patent No.: US 7,691,267 B2
(45) Date of Patent: Apr. 6, 2010

(54) MULTI-GAS BIOREACTOR AND RELATED METHODS

(75) Inventors: Daniel P. Smith, Thonotosassa, FL (US); Tony Rector, Broad Brook, CT (US); Jay L. Garland, Cocoa, FL (US)

(73) Assignee: Dynamac Corporation, Rockville, MD (US)

( * ) Notice: Subject to any disclaimer, the term of this patent is extended or adjusted under 35 U.S.C. 154(b) by 108 days.

(21) Appl. No.: 12/038,442

(22) Filed: Feb. 27, 2008

(65) Prior Publication Data

US 2008/0264860 A1    Oct. 30, 2008

Related U.S. Application Data

(60) Provisional application No. 60/892,750, filed on Mar. 2, 2007.

(51) Int. Cl.
*C02F 3/00* (2006.01)
(52) U.S. Cl. .................. 210/601; 210/620; 210/631; 210/150; 210/757; 210/758; 210/500.23
(58) Field of Classification Search ................. 210/601, 210/620, 631, 757, 758, 150, 500.23
See application file for complete search history.

(56) References Cited

U.S. PATENT DOCUMENTS

| 7,303,677 B2 * | 12/2007 | Cote et al. ............... 210/615 |
| 2006/0096918 A1 | 5/2006 | Semmens ............... 210/615 |

* cited by examiner

*Primary Examiner*—Chester T Barry
(74) *Attorney, Agent, or Firm*—Allen, Dyer, Doppelt, Milbrath & Gilchrist, P.A. Attorneys at Law

(57) ABSTRACT

A bioreactor is for processing a fluid stream. The bioreactor may include a bioreaction chamber for receiving the fluid stream therethrough, a pair of spaced apart gas header assemblies within the bioreaction chamber for coupling to first and second gases, a first plurality of hollow fiber membranes (HFMs) extending between the pair of gas header assemblies for introducing the first gas into the fluid stream within the bioreaction chamber, and a second plurality of HFMs extending between the pair of gas header assemblies for introducing the second gas into the fluid stream within the bioreaction chamber.

24 Claims, 8 Drawing Sheets

MULTI-GAS BIOREACTOR AND RELATED METHODS

CROSS-REFERENCE TO RELATED APPLICATIONS

This application claims the benefit of U.S. Provisional Application No. 60/892,750 filed Mar. 2, 2007.

GOVERNMENT LICENSE RIGHTS

This invention was made with Government support under contract No. NNK04ED59A/NAS10-02001, awarded by the National Aeronautics and Space Administration, Kennedy Space Center, Florida. The Government has certain rights in this invention.

FIELD OF THE INVENTION

The present invention relates to the field of bioreactors, and, more particularly, to a bioreactor using a plurality of gases and related methods.

BACKGROUND OF THE INVENTION

A bioreactor typically comprises a bioreaction chamber for housing a biologically active environment. Within the bioreaction chamber, the bioreactor establishes and maintains the environment to optimize the desired biochemical activity. For example, the bioreactor may regulate the amount of Oxygen in the environment. The desired biochemical reaction is used to process an influent, for example, wastewater. Once processed, the bioreactor outputs effluent. Indeed, a common rudimentary bioreactor is a septic tank.

In applications where traditional treatment of wastewater, for example, sewage infrastructure systems, and septic tanks, may be impractical or insufficient to achieve a desired treatment objective, bioreactors may be used. For example, U.S. Patent Application Publication No. 2006/0096918 to Semmens discloses a bioreactor for treatment of wastewater. The bioreactor includes hollow fiber membranes (HFMs) in the bioreaction chamber. Gases are passed through the HFMs to encourage bacteria and other microorganisms to form a layer on the surfaces of the HFMs.

This layer of microorganisms is called a biofilm and may be used to treat wastewater by processing certain compounds. The bioreactor of Semmens passes Oxygen through the HFMs to encourage growth of more advanced microorganisms on the surface of the HFMs. The bioreactor may alternatively pass other gases through the HFMs, for example, air and Hydrogen. Moreover, in one embodiment, Oxygen and Hydrogen may be flowed sequentially by using a series of bioreactors. In other words, the Oxygen is flowed in the bioreaction chamber of the first bioreactor. The effluent of the first bioreactor is the influent of the second bioreactor. Hydrogen is flowed through the HFMs of the second bioreactor. A drawback to this approach is the use of two bioreactors may be undesirable for applications where space is limited, for example, a spacecraft.

Another bioreactor for processing of wastewater is disclosed in U.S. Pat. No. 7,303,677 to Cote et al. This bioreactor includes a weave of HFMs within the bioreaction chamber for growing biofilm. Oxygen, or in the alternative, Hydrogen, is passed through the HFMs to encourage the desired biochemical reaction.

SUMMARY OF THE INVENTION

In view of the foregoing background, it is therefore an object of the present invention to provide a bioreactor that is efficient and consumes less space.

This and other objects, features, and advantages in accordance with the present invention are provided by the bioreactor for processing a fluid stream that may include a bioreaction chamber for receiving the fluid stream therethrough, a pair of spaced apart gas header assemblies within the bioreaction chamber for coupling to first and second gases, a first plurality of hollow fiber membranes (HFMs) extending between the pair of gas header assemblies for introducing the first gas into the fluid stream within the bioreaction chamber, and a second plurality of HFMs extending between the pair of gas header assemblies for introducing the second gas into the fluid stream within the bioreaction chamber. Advantageously, the bioreactor may treat the fluid stream with the first and second gases.

More specifically, each gas header assembly may comprise an inner gas header and an outer gas header adjacent thereto. The inner gas header may comprise an inner header body having an inner gas chamber therein, a plurality of inner blind holes terminating respective HFMs to be in fluid communication with the inner gas chamber, and a plurality of through holes receiving therethrough other respective HFMs.

Additionally, the outer gas header may comprise an outer header body having an outer gas chamber, and a plurality of outer blind holes terminating respective HEFMs to be in fluid communication with the outer gas chamber. The inner gas header may further comprise an inner gas port coupled in fluid communication with the inner gas chamber and extending through the bioreaction chamber. Moreover, the outer gas header may further comprise an outer gas port coupled in fluid communication with the outer gas chamber and extending through the bioreaction chamber. For example, in some embodiments, the bioreaction chamber may have a cylindrical shape defining an axis, and the first and second pluralities of HFMs may extend parallel to the axis.

The bioreactor may further comprise a first gas source for the first gas, the first gas comprising an oxidizing gas. Also, the bioreactor may further comprise a second gas source for the second gas, the second gas comprising a reducing gas. More particularly, the first gas may comprise Oxygen, and the second gas may comprise Hydrogen. Each HFM of the pluralities of first and second HFMs may comprise a silicone elastomer HFM. Furthermore, the bioreactor may further comprise a biofilm covering outer surfaces of the pluralities of first and second HFMs.

Another aspect is directed to a method of treating a fluid stream. The method may include passing the fluid stream through a bioreaction chamber, flowing a first gas through a first plurality of HFMs within the bioreaction chamber while the fluid stream is passing therethrough, and flowing a second different gas through a second plurality of HFMs within the bioreaction chamber also while the fluid stream is passing therethrough.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
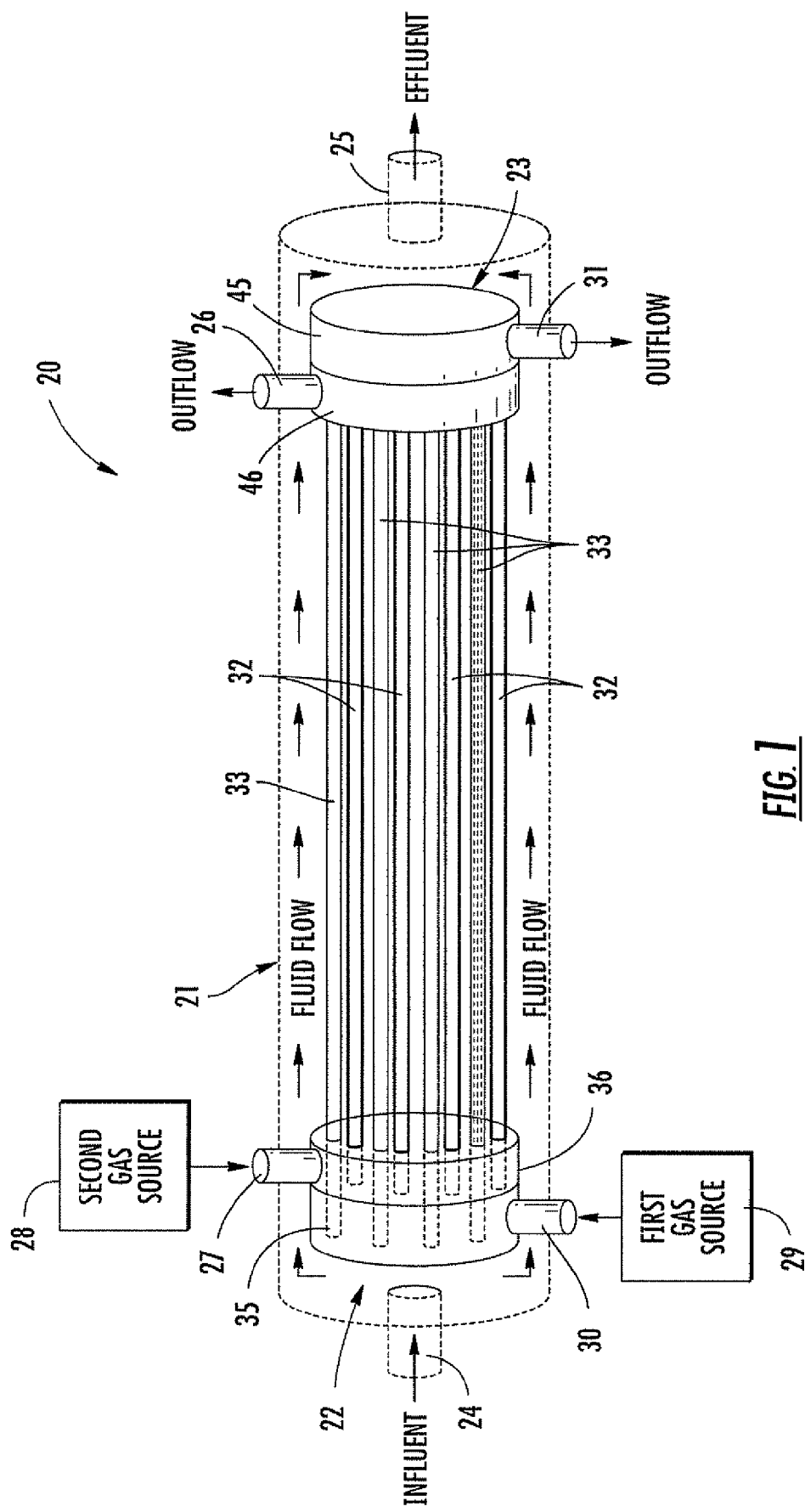
FIG. 1 is a schematic side view of a bioreactor according to the present invention.

Referring initially to FIG. 1, a bioreactor 20 is now described. The bioreactor 20 is for processing a fluid stream, i.e. influent, and illustratively includes a bioreaction chamber 21 (shown with dashed lines) for receiving the fluid stream therethrough. The fluid stream may comprise, for example, wastewater. The bioreactor 20 illustratively includes a pair of spaced apart gas header assemblies (FIG. 1: left 22 and right 23) within the bioreaction chamber 21 for coupling to first and second gases. The bioreactor 20 illustratively includes a first gas source 29 for the first gas, the first gas comprising an oxidizing gas, for example, Oxygen $O_2$. Also, the bioreactor 20 also illustratively includes a second gas source 28 for the second gas, the second gas comprising a reducing gas, for example, Hydrogen $H_2$. As will be appreciated by those skilled in the art, other gases with similar chemical properties may be used, such as, Methane $CH_3$.

The bioreactor 20 illustratively includes a first plurality of hollow fiber membranes 33 (HFMs) extending between the pair of gas header assemblies 22-23 for introducing the first gas into the fluid stream within the bioreaction chamber 21. Moreover, the bioreactor 20 illustratively includes a second plurality of HFMs 32 extending between the pair of gas header assemblies 22-23 for introducing the second gas into the fluid stream within the bioreaction chamber 21. Although the bioreactor 20 illustratively includes an equal number of the first 33 and second 32 HFMs, in the alternative, the bioreactor may include a different number of first HFMs and second HFMs. Each of the plurality of first 33 and second HFMs 32 may comprise a silicone elastomer HEM, for example, Silastic HFMs, as available from the Dow Chemical Company of Midland, Mich. Advantageously, the bioreactor 20 may treat the fluid stream with the first and second gases simultaneously.

Figure 2:
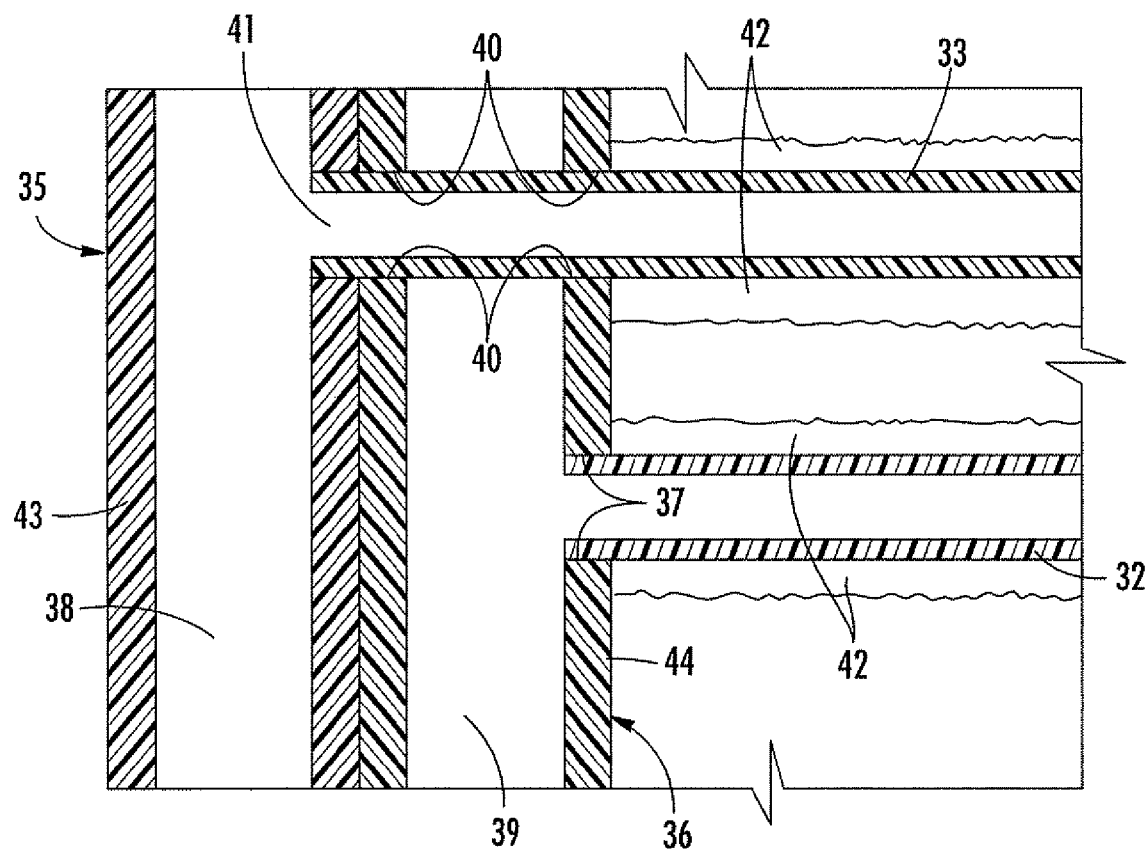
FIG. 2 is a greatly enlarged cross-sectional schematic diagram of a portion of the gas header assembly of the bioreactor in FIG. 1.
Figures 3A, 3B:
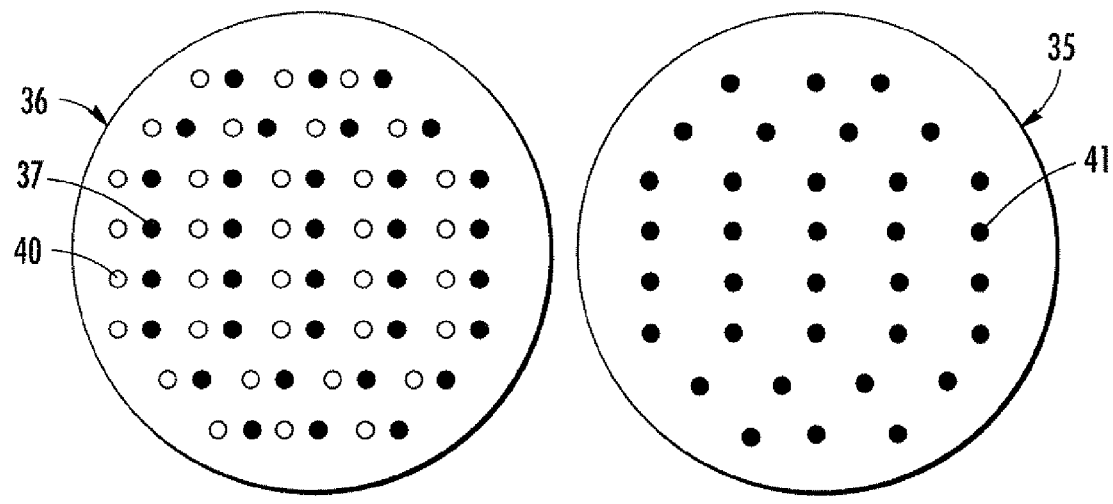
FIG. 3a is a schematic plain view of the inner gas header of the bioreactor in FIG. 1.
FIG. 3b is a schematic plain view of the outer gas header of the bioreactor in FIG. 1.

Referring now additionally to FIGS. 2, 3a, & 3b, each gas header assembly 22-23 illustratively includes a respective inner gas header 36, 46, and outer gas header 35, 45 adjacent thereto. For clarity of explanation, the left gas header assembly 22 is now discussed in greater detail. The inner gas header 36 illustratively includes an inner header body 44 having an inner gas chamber 39 therein, and a plurality of inner blind holes 37 (only being illustrated in FIG. 2) terminating respective HFMs 32 to be in fluid communication with the inner gas chamber. The inner gas header 36 illustratively includes a plurality of through holes 40 receiving therethrough other respective HEFMs 33. In the illustrated embodiment, each of the through holes 40 includes a pair of aligned openings. Although, in other embodiments, each through hole 40 may be in the form of a tubular passageway.

The outer gas header 35 illustratively includes an outer header body 43 having an outer gas chamber 38, and a plurality of outer blind holes 41 terminating respective HEFMs 33 to be in fluid communication with the outer gas chamber. In other words, and as perhaps best seen in FIG. 2, the HEFMs 33 introducing the first gas into the bioreactor chamber 21 illustratively pass through the inner gas header 36 and terminate in the outer gas header 35 whereas the HFMs 32 introducing the second gas terminate in the inner gas header 36. An adhesive (not shown) may be used to secure each HFM 32, 33 into its respective blind hole 41, 37 as will be appreciated by those skilled in the art.

As will be appreciated by those skilled in the art, this arrangement of gas headers and gas types could be changed, for example, reversed so that the inner gas chamber could alternatively be filled with the first gas. As will be appreciated by those skilled in the art, the right gas header assembly 23 similarly comprises an inner gas header 46 and an outer gas header 45. Moreover although not shown for simplicity, the HFMs 32-33 may terminate in inverse arrangement. In other words, the HEFMs 32 introducing the second gas into the bioreactor chamber 21 illustratively pass through the inner gas header 46 and terminate in the outer gas header 45 of the second gas header assembly 23 whereas the HFMs 33 introducing the first gas terminate in the inner gas header 36. In the alternative, the HFMs 32-33 may terminate in an identical arrangement in both gas header assemblies 22-23.

The inner gas header 36 illustratively includes an inner gas port 27 coupled in fluid communication with the inner gas chamber 39 and extending through the bioreaction chamber 21. Moreover, the outer gas header 35 illustratively includes an outer gas port 30 coupled in fluid communication with the outer gas chamber 38 and extending through the bioreaction chamber 21. The amount of first and second gases introduced into the bioreaction chamber 21 may be varied independently of each other by way of changing the pressure at the inner 27 gas and outer 30 gas ports. For example, the first and second gases may be introduced into the bioreaction chamber 21: in pulses, separately in sequence, or using varying flow rates. The inner gas header 46 of the second gas header assembly 23 illustratively includes an inner gas outlet port 26 in fluid communication with a respective inner gas chamber, and the outer gas header 45 of the second gas header assembly 23 illustratively includes an outer gas outlet port 31 in fluid communication with a respective outer gas chamber.

Moreover, the bioreactor 20 may be operated in flow through mode, i.e., the first gas may flow sequentially through: the outer gas port 30; the outer gas chamber 38; the first HFMs 33; the inner gas chamber of the second gas header assembly 23; and the inner gas outlet port 26. Differently, the second gas may flow sequentially through: the inner gas port 27; the inner gas chamber 39; the second HFMs 32; the outer gas chamber of the second gas header assembly 23; and the outer gas outlet port 31.

The bioreaction chamber 21 illustratively includes a cylindrical shape defining an axis, and the first and second pluralities of HFMs 32-33 may extend parallel to the axis. Advantageously, the parallel arrangement of the HFMs 32-33 in the cylindrical bioreaction chamber 21 provides for efficient biochemical reactions and development of biofilm 42 (FIG. 2) covering outer surfaces of the plurality of first and second HFMs 32-33.

The bioreactor 20 illustratively includes an influent port 24 in fluid communication with the bioreaction chamber 21. The influent port 24 introduces the fluid stream to be treated into the bioreactor 20. Also, the bioreactor 20 illustratively includes an effluent port 25 in fluid communication with the bioreaction chamber 21. The effluent port 25 removes treated fluid stream from the bioreaction chamber 21. Although not shown, the bioreactor 20 may recycle processed fluid stream back into the influent port 24 for further processing.

In other embodiments, not shown, the bioreactor 20 may further include a plurality of influent ports 24 and effluent ports 25. Moreover, the influent 24 and effluent 25 ports may be positioned to flow the fluid stream orthogonally to the first 33 and second 32 pluralities of HFMs. As will be appreciated by those skilled in the art, the bioreactor 20 may process the fluid stream continuously. A controller, not shown, may be used to control the first and second gas sources 29, 28 in accordance with a look-up table, or based upon real-time sensor readings, for example, pH, dissolved Oxygen readings or based upon programmed operation, such as, pulsed delivery of one or both gas streams.

Another aspect is directed to a method of treating a fluid stream. The method may include passing the fluid stream through a bioreaction chamber 21, flowing a first gas through a first plurality of HFMs 33 within the bioreaction chamber while the fluid stream is passing therethrough, and flowing a second different gas through a second plurality of HFMs 32 within the bioreaction chamber also while the fluid stream is passing therethrough.

Referring additionally to FIGS. 4-8, as will be appreciated by those skilled in the art, experimental testing of an exemplary implementation of the bioreactor 20 is now described.

Section 1: Reactor Design

The basic design involved a pressurized bundle of membrane fibers (first and second pluralities of HFMs 32-33) allowing for gas diffusion into a cylindrical vessel (bioreaction chamber 21) containing a circulating media (FIG. 1). The module design may be based on individually potting fibers in a pre-designed grid affixed to a custom designed end cap (gas header assemblies 22-23) that contained separate header chambers (inner and outer gas headers 35-36) for distribution of $O_2$ and $H_2$. Exemplary specifications of the bioreactor 20 are listed in Table 1, shown below.

TABLE 1

Bioreactor Specifications

| Parameter | Prototype |
| --- | --- |
| Fiber Type | Platinum Cured Silastic |
| Fiber outer diameter | 1.65 mm |
| Fiber effective length | 33 cm |

TABLE 1-continued

Bioreactor Specifications

| Parameter | Prototype |
| --- | --- |
| Number of $O_2$ Fibers | 34 |
| $O_2$ fiber outer surface area | 582 cm$^2$ |
| Number of $H_2$ Fibers | 34 |
| $H_2$ fiber outer surface area | 582 cm$^2$ |
| Reactor Column Empty Bed Volume | 1780 cm$^3$ |
| System Liquid Volume | 2200 cm$^3$ |
| Influent Flow Rate | 0.3 to 1.5 cm$^3$/min |
| Recycle Flow Rate | 300 cm$^3$/min |
| Hydraulic Residence Time[1] | 1.02 day |
| Liquid superficial velocity[2] | 5.8 cm/min |

The juxtaposition of $O_2$ and $H_2$ fibers is quite advantageous. A header design was developed in which the fiber grids for each gas were overlaid, creating separate gas cavities and insuring isolation of $O_2$ and $H_2$ gas streams, as perhaps best seen in FIG. 1. Gas ports located in each cavity allow separate delivery and control of $O_2$ and $H_2$ to respective fiber sets. Module, grid, and end caps were machined from polycarbonate polymer rod, as available from United States Plastics Corporation of Lima, Ohio, and fibers were potted in place using epoxy, for example, Bio-Clear 810 as available from Progressive Polymers Incorporated of Pittsfield, N.H. The end caps and module body were assembled into a single unit and tension was applied to the fibers by threaded rods running the length of module.

A test stand was fabricated with physical components to house the bioreactor 20 and operational components essential to bioreactor operation. Oxygen having greater than 99.989% purity was supplied from a pure Oxygen cylinder, as available from Boggs Gases Company of Titusville, Fla., and for $H_2$, a generator was used, for example, a Parker Balston 9150, as available from the Parker Hannifin Corporation of Cleveland, Ohio. The $O_2$ and $H_2$ gases were delivered to the reactor in 1/8" stainless steel lines, and both operated in flow through mode.

Gas flow rates were measured through mass flow meters (Aalborg GFM 17, as available from the Cole-Parmer Instruments Company of Vernon Hill, Ill.) and the pressure of each stream was monitored via pressure transducers (Model 225, as available from Setra Incorporated of Boxborough, Mass.) on the inlet side. To regulate gaseous pressure in the membrane module, inlet pressure regulators (Parker Models 14R013FC and 80F, as available from the Parker Hannifin Corporation of Cleveland, Ohio) and outlet back pressure regulators, as available from the Cole-Parmer Instruments Company of Vernon Hill, Ill., were used. A control system/logic was established using an OPTO 22, as available from the OPTO 22 Company of Temecula, Calif., to monitor and record output data from instruments.

Section 2: Reactor Operation

The operational history of the bioreactor 20 prototype is shown in Table 2, shown below.

TABLE 2

Bioreactor Operating Conditions

| Operational Stage | Day of Experiment | $Q_{forward}$, ml/min | $Q_{recycle}$, ml/min | $O_2$ inlet pressure, psi | $H_2$ inlet pressure, psi |
|---|---|---|---|---|---|
| Nitrification establishment | 1-33 | 0.30 | 300 | 2.0 | 0 |
| | 34-42 | 1.0 | | 0.23 | |
| | 43-68 | 1.5 | | 0.15 | |
| Initiation of $H_2$ addition | 69-77 | 1.5 | 300 | 0.15 | 0.60 |
| | 78-79 | | | 0.12 | |
| $H_2$ on/liquid recycle off/on | 80-90 | 1.5 | 0 | 0.12 | 0.60 |
| | 91-106 | | 0 | 0.16 | |
| | 107-117 | | 300 | 0.18 | |
| $H_2$ on/off experiments | 118-121 | 1.5 | 300 | 0.18 | 0 |
| | 122-126 | | | | 0.60 |
| | 127-130 | | | | 0 |
| | 131-136 | | | | 0.60 |
| Increasing inlet $O_2$ pressure | 137-153 | 1.5 | 300 | 0.40 | 0.60 |
| | 154-176 | | | 0.85 | |
| Increased inlet $H_2$ pressure | 177-190 | 1.5 | 300 | 0.85 | 1.2 |
| Constant $O_2/H_2$ operation | 191-215 | 1.5 | 300 | 0.85 | 0.6 |

The reactor was operated at an average water temperature of 25.6° C. ±1.53. The initial startup feed flow rate was 0.3 ml/min but was increased by Day 43 to 1.5 ml/min, where it remained for the duration of the study. Recycle of liquid effluent was employed based on the perceived significance of liquid velocity to transfer of solutes from bulk liquid to biofilms growing on $O_2$ and $H_2$ HFs. When employed, the recycle flow rate of 300 cm$^3$/min dominated the advective flow through the reactor and provided a 5.8 cm/min superficial liquid velocity regardless of influent feed flow rate. Effluent recycle may also reduce longitudinal concentration gradients in reactor bulk fluid.

The bioreactor 20 received a synthetic feed developed to simulate the concentration of ammonia that would occur in a closed loop urine recycling system. The feed contained 217 mg L$^{-1}$ $NH_4^+$—N, supplemented with $KH_2PO_4$ buffer and inorganic elements required for the growth of nitrifying microorganisms.

Concentration (g L$^{-1}$) of specific elements were as follows; $NH_4^+$—N (0.217), NaCl (0.84), $KHCO_3$ (0.37), $KH_2PO_4$ (0.18), $CaCl_2$ (0.15), $KHSO_4$ (0.11), $MgSO_4$ (0.10), $FeCl_2$ (0.014). The bioreactor 20 was initially seeded with two sources of nitrifying inoculum: a sample from a separate sludge nitrification process at the City of Tampa's municipal wastewater treatment plant, and a laboratory enrichment culture of mixed liquor from the aerobic basin of the Cape Canaveral Air Force Station wastewater treatment plant grown on the synthetic media described above.

On Day 69, when $H_2$ supply was initiated, the bioreactor 20 was reseeded with backwash collected from methanol-fed tertiary denitrification filters at the City of Tampa's municipal wastewater treatment plant, as well as 2 strains of a known autohydrogenotrophic denitrifier, Cupriavidus necator (DSMZ strains 428 and 3102).

Section 3: Monitoring

Feed and effluent samples were collected three times a week for analysis of ammonia, nitrate, and nitrite ions. Samples were filtered using a 0.2 μm Millipore syringe filter (Model A-02915-90, as available from the Cole-Parmer Instruments Company of Vernon Hill, Ill.) and analyzed using a Dionex-120 Ion Chromatograph, as available from the Dionex Corporation of Sunnyvale, Calif., linked to Chromeleon Software (PeakNet Version 6.4, Sunnyvale, Calif., also available from the Dionex Corporation).

Oxygen profiles within the bioreactor 20 were obtained using an Oxygen micro-sensor (OX500, as available from Unisense A/S of Aarhus, Denmark) and a pico-meter (PA2000, as available from Unisense A/S of Aarhus, Denmark). The reactor vessel contained several ports down its length through which the microelectrode was inserted and sealed with a compression fitting. Cross-sectional area measurements were controlled with the use of a micromanipulator (MM-33, as available from Unisense A/S of Aarhus, Denmark). Before use, the Oxygen micro-sensor was prepolarized and calibrated using a customized micro-probe calibration chamber (CAL300, as available from Unisense A/S of Aarhus, Denmark).

Biofilm Sampling and Analysis The prototype bioreactor 20 design did not allow for conducting activity measurements on intact biofilms within the reactor shell. The HF module was removed from the reactor on Day 215, and biofilm was removed from various sections of silastic tubing. The biofilms pealed off the fibers in a cohesive unit, facilitating subsequent handling. Three replicate 10 mm sections of each fiber type ($H_2$, $O_2$) were randomly sampled from the reactor module. For protein and dry weight determination, 10 mm tubing lengths were stored at −80° C. until analysis. Samples were dried using a centrifugal dryer (Speedvac 100, Savant, Farmingdale, N.Y.) and weighed to calculate dry mass. Samples were then resuspended in deionized water and subjected to bead beating (Mini-Beadbeater, as available from Biospec products of Bartlesville, Okla.) for 1 min. and centrifugation at 4° C. 14,000 RPM for 45 min. Quantification of total protein was performed using the BCA protein assay kit Separate 10 mm sections were collected and fixed with paraformaldehyde for estimation of total cell density via epifluorescence microscopy. Biofilm was disaggregated by vigorous mixing and repeated pipetting. Suspensions were stained with 0.1% acridine orange solution before filtering through black 0.2 μm polycarbonate filters. Cell counts were performed using a Zeiss Axioskop 2 microscope equipped with an Autoarc 2 mercury lamp, as available from Carl Zeiss of Thornwood, N.Y. A fixed volume of sample was dried (70° C. overnight) to determine total cells per dry mass.

Biological Oxygen consumption by the biofilms in response to addition of ammonia, nitrite, or organics was assessed using a microtiter-based Oxygen sensor system. Separate 20 mm pieces of intact tubing (three of each type ($H_2/O_2$)) were placed in 1 ml of bioreactor media without Nitrogen and biofilm was disrupted by shaking and repeated pipetting. Resulting biofilm suspensions (50 µl) were added to BDoxy microtiter plates, as available from BED Biosciences of Bedford, Mass., along with equal volumes of both phosphate-buffered mineral salts and one of the following energy sources (final concentration): $NH_4^+$—N (100 mg $L^{-1}$), $NO_2^-$—N (100 mg $L^{-1}$), and R2B medium (mixture of yeast extract, peptone, casamino acids, dextrose, starch, pyruvate at final concentration of 1 g $L^{-1}$).

Oxygen consumption in the plates was monitored by measuring the fluorescence of an Oxygen-quenched, ruthenium-based dye embedded into a gel layer on the bottom of the plates. Fluorescence was measured every 30 min for 48 hours at 25° C. using a Wallac Victor$^2$ Fluorometer, as available from Perkin Elmer of Wellesly, Mass., with 485 nm excitation/590 nm emission filters. The time required for fluorescence to increase to 10% greater than background (i.e., minimum response time) was quantified as an estimate of the rate of biological Oxygen consumption in response to the different substrates.

Terminal-Restriction Fragment Length Polymorphism (T-RFLP) community profiling of samples from day 215 was conducted to provide information on the structure of biofilm communities. DNA was extracted and purified using the MoBio UltraClean Soil DNA kit, as available from MoBio of Carlsbad, Calif., and then amplified with a range of primers designed to provide 16S SSU rDNA or mRNA functional gene information. Each forward primer was labeled with a FAM fluorescent dye and each reverse primer was labeled with a HEX fluorescent dye, as available from Sigma-Genosys of St. Louis, Mo. The first polymerase chain reaction (PCR) was conducted with the universal bacterial 16S primers 27 Forward (F) and 1492 Reverse (R).

The nested PCR of these universal bacterial oligonucleotides were unlabeled. PCR was performed in 50 µL reaction volumes containing IX of 10× PCR buffer, as available from Applied Biosystems of Foster City, Calif., 0.4 mg/ml bovine serum albumin, as available from Roche of Indianapolis, Ind., 1 µM forward and reverse primer (Sigma), 2 mM MgCl2 (ABI), approximately 10 ng of template DNA, 0.025 U of Taq polymerase (ABI), 0.2 mM concentration of each deoxynucleoside triphosphate (dNTP)(ABI) and was adjusted to the final volume with PCR quality water.

Figure 4:
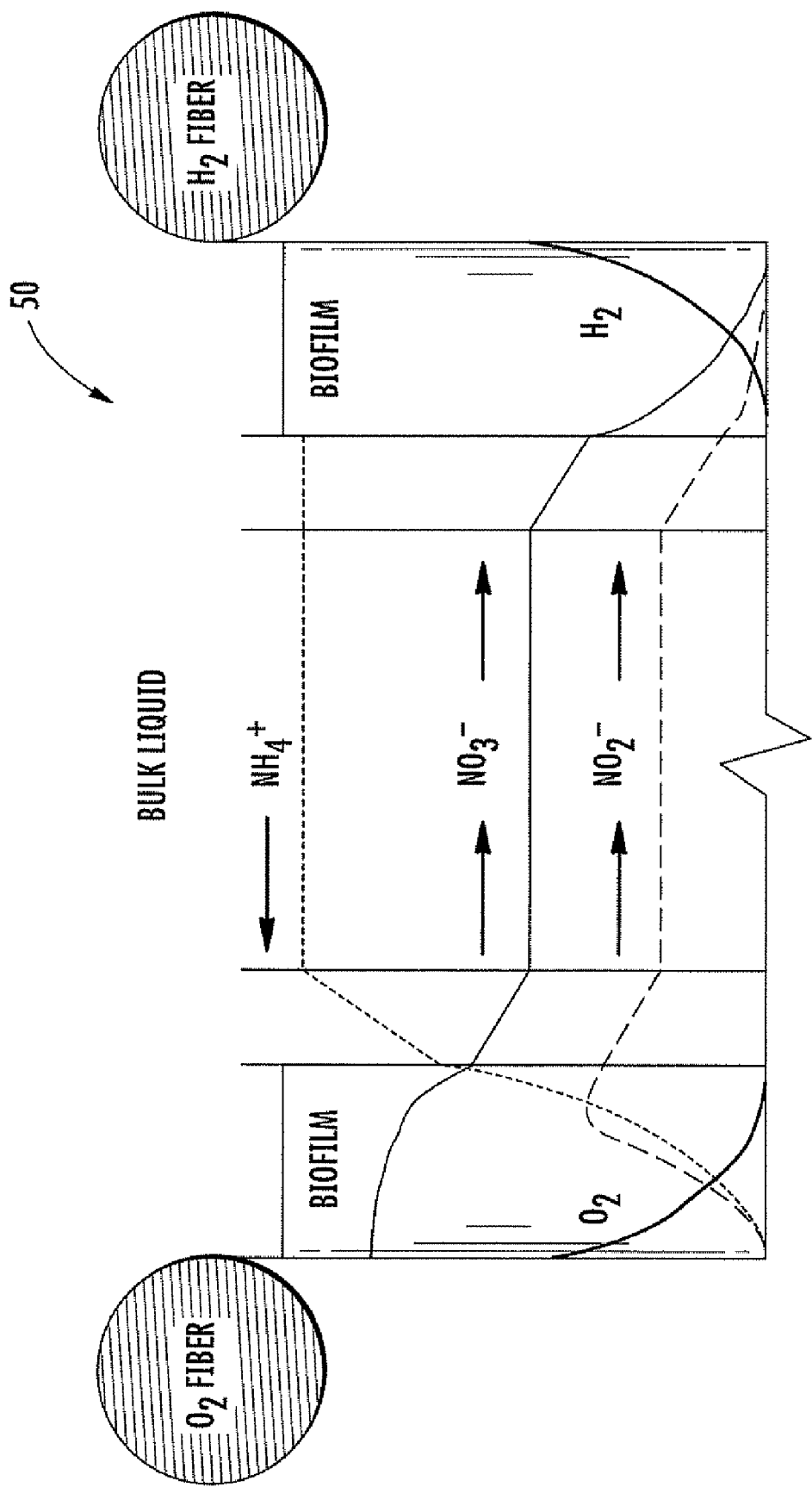
FIG. 4 is a diagram illustrating the inter-fiber Nitrogen shuttle process.

The AOB mRNA functional gene for ammonia monoOxygenase was evaluated with the amoA-1F and amoA-2R primers. The AOB 16s SSU rDNA nested PCR for β-Proteobacteria was performed with the EUB338-F and NS01225-R primers. The NOB 16s SSU rDNA nested PCR for Nitrobacter was performed with the EUB338-F and NIT3-R primers. The NOB 16s SSU rDNA nested PCR for Nitrospira was performed with the EUB338-F and NTSPA685-R primers. The NOS mRNA denitrifier functional gene for nitrous oxide reductase was evaluated with the Nos661-F and Nos1773-R primers. The Anammox 16s SSU rDNA nested PCR for Planctomycetales was performed with the Pla46-F and Amx820-R primers (FIG. 4) A 1.5% agarose (Sigma) gel electrophoresis was performed before and after PCR to confirm the presence of DNA and PCR product. Referring to FIG. 4, a diagram 50 illustrates the inter-fiber Nitrogen shuttle process.

Following PCR, the different amplicons were cut with different restriction enzymes to provide a community profile for each sample; the universal gene was treated with Msp I, Hha I, and Rsa I, as available from New England Biolabs (NEB) of Ipswich, Mass., the AOB mRNA functional gene for ammonia monoOxygenase with Aci I, and all others Msp I. Each sample restriction digest contained 7 µL of ultra pure water, 2 µL of the 10× buffer provided with the enzyme, 10 µL of the PCR product, and 1 µL of the enzyme. Each sample was digested for 5 hours at 37° C. and then deactivated at 65° C. for 20 minutes. Once the restriction digest was completed it was purified and desalted with the QIAquick Nucleotide Removal kit, as available from Qiagen of Valencia, Calif.

Each sample was then prepared for analysis on the ABI 310 Genetic Analyzer by combining 10 µL of desalted digest with 15 µL of Hi-Di Formamide (ABI) and 0.75 µL of Internal Lane Standard 600 (ILS 600), as available from Promega of Madison, Wis. The formamide was denatured at 95° C. for 5 minutes and then the sample was placed on ice until it was loaded on the instrument. The TRFLP GeneScan run parameters for the ABI 310 are: Virtual Filter Set D, 15 kV injection voltage, 5 sec injection time, 15 kV run voltage, 30 min run time, 60° C. run temperature.

Data reduction was performed by the Genotyper program (ABI) and produced binary data for each sample. The binary data was then statistically analyzed utilizing the Statistical Package for the Social Sciences (SPSS). Similarities amongst the replicate samples (N=3) from a single type of fiber and between samples from the different types of fibers compared utilizing the Jaccard coefficient and was used to produce a similarity matrix for the community profile.

Biofilm samples from day 215 were also analyzed using flourescent in situ hybridization (FISH) and oncfocal laser microscopy to provide further insight into the spatial structute of the biofilms. Intact biofilm sections peeled from the oxygen and Hydrogen hollow fibers were fixed in 4% paraformaldyhyde at 4° C. for 1 hour, washed in PBS and dehydrated in a series of 50%, 80% and 96% ethanol. If not immediately used, biofilms were stored frozen in 50% ethanol and dehydration was completed before processing for hybridization. Fixed biofilm pieces were individually placed (biofilm bottom side up) in a well of a 9 well microtiter plate containing a few mm (enough to cover) of Tissue Tek O.C.T. compound, as available from Sakura Finetek of Torrence, Calif. The plate was sealed with parafilm and incubated overnight at 4° C.

To prepare frozen blocks for sectioning, biofilm samples were placed in a small plastic weigh cup with a few mm O.C.T. compound. While on dry ice, additional O.C.T. compound was added to the top of the biofilm section and was allowed to freeze. Frozen blocks were stored at −80° C. until trimming and sectioning in a cryotome, as available from Leica Microsystems of Wetzler, Germany, set at −20° C. 10-12 µm cross sections of the biofilm were collected (2 per slide) on poly-L-lysine coated slides, as available from Electron Microscopy Sciences (EMS) of Hartfield, Pa., with an additional layer of adhesive applied with a Fro-Marker, as available from EMS of Hartfield, Pa. Slides were allowed to air dry overnight to ensure attachment of the sections to the slide.

After drying, O.C.T. medium was removed by dissolving with a few drops of DI water applied carefully to the slides followed by dipping in water. After air drying, sections were dehydrated in a series of ethanol concentrations (50%, 80%, 96%). An additional fixation was performed on the slides in 4% paraformaldyhyde at room temperature for 20 minutes followed by a PBS rinse for 30 minutes. Slides were dehydrated in the series of ethanol concentrations (50%, 80%, 96%) for 3 minutes and air dried. A hydrophobic barrier was drawn around each biofilm section to contain the probe mixture using a Liquid Blocker Super Pap Pen, as available from Daido Sangyo Company LTD of Tokyo, Japan.

A total volume of 48 µl of probe (50 ng/µl) and hybridization buffer (mixed 1:8 v/v) was placed on the biofilm sample delineated by the hydrophobic barrier. In preparation of the hybridization buffer, formamide was added at concentrations for appropriate stringency for optimal hybridization as previously described (Table 1). Slides were placed in individual "hybridization chambers" (50 ml plastic centrifuge tubes placed horizontally) and incubated at 46° C. for 2-3 hours. Wash buffer with appropriate concentrations of NaCl (Table 1) was prepared and pre-warmed in the incubator before washing for 10 minutes at 48° C. Slides were rinsed in DI water, air dried and mounted in Citifluor AFI, as available from Citiflour of London, United Kingdom. Each of the NOB specific probes were hybridized with the AOB specific probe. (Table 1) Since dual probes were used on biofilm sections, the probes with highest stringency were used first followed by subsequent hybridization with probes with lower stringency requirements.

The probes used to target specific ammonia and nitrite oxidizing bacteria along with the target sequences and previously described hybridization conditions are listed in Table 2. The probes targeting the nitrite oxidizing bacteria were labeled with fluorescein isothiocyanate (FITC) while the probe targeting ammonia oxidizing bacteria was labeled with indodicarbocyanine (Cy5). All probes were obtained from Sigma-Genosys of St. Louis.

Digital images of biofilm sections after FISH were collected using an Ultraview ERS-3E Confocal System, as available from Perkin Elmer of Bridgeport, Conn., equipped with an Olympus IX81 inverted scope, as available from Olympus of Melville, N.Y., and a krypton/argon ion laser system, as available from Melles Griot of Carlsbad, Calif., using excitation wavelengths of 488 nm and 647 nm in this study. Biofilm thickness was measured using the distance function on the Ultra view software.

Section 4: Flux Calculations

Fluxes were calculated using Equations 1-3 and the measured influent and effluent concentrations of inorganic Nitrogen species. $NH_4^+$—N and $NO_2^-$—N fluxes were normalized to total outer surface area of $O_2$ HF, while $NO_3^-$—N flux was normalized to total outer surface area of $H_2$ HF. Equations 1-3 assume that all utilized ammonia is oxidized to nitrite, all utilized nitrite is oxidized to nitrate, and all nitrate utilization is by Hydrogenotrophic reduction to $N_2$.

The calculated flux for nitrite is provisional because a portion of the nitrite utilized could be transported to the $H_2$ HF and reduced to $N_2$. In this case, calculated fluxes of nitrite (at $O_2$ HF) and nitrate (at $H_2$ HF) would be reduced. It is noted that, if a portion of nitrite were oxidized at $O_2$ HF and a portion denitrified at $H_2$ HF, the overall "flux" of oxidized Nitrogen (i.e. ($NO_3^-$+$NO_2^-$)—N) normalized to either $O_2$ or $H_2$ surface (which are equal), would equal the flux calculated for nitrate by Equation 3.

Biofilm activity, defined as the metabolic electron equivalents rate per membrane surface area, was estimated using 0.54 e. equiv. $O_2$/g $NH^+_4$—N and 0.34 e. equiv. $H_2$/g $NO_3^-$—N.

$$J_{NH_4^+-N} = Q \cdot (NH_4^+-N_{Influent} - NH_4^+-N_{Effluent})/A_{O_2} \quad (1)$$

$$J_{NO_2^--N} = J_{NH_4^+-N} - Q \cdot NO_2^--N_{Effluent}/A_{O^2} \quad (2)$$

$$J_{NO_3^--N} = J_{NO_2^--N} - Q \cdot NO_3^--N_{Effluent}/A_{H_2} \quad (3)$$

$$J_{O_2-e.equiv.} = 0.429 \cdot J_{NH_4^+-N} + 0.143 \cdot J_{NO_2^--N} \quad (4)$$

$$J_{H_2e.equiv.} = 0.357 \cdot J_{NO_3^--N} \quad (5)$$

where J=flux ($ML^{-2}T-1$), Q=flow rate ($L^3T^{-1}$), N=concentration ($ML^{-3}$), and A=surface area ($L^2$)

Section 5: Results and Discussion Operation Stages

The bioreactor 20 operating conditions throughout the study are listed in Table 2. The prototype was operated through a sequence of distinguishable operational stages, designated nitrification establishment (Day 1-68), initiation of $H_2$ addition (Day 69-79), H2 on/liquid recycle off (Day 80-117), $H_2$ on/off experiments (Day 118-136), increasing $O_2$ inlet pressures (Day 137-176), increased $H_2$ inlet pressure (Day 177-190), and constant $O_2/H_2$ operation (Day 191-215). Results are presented and discussed following these different stages.

Figure 5:
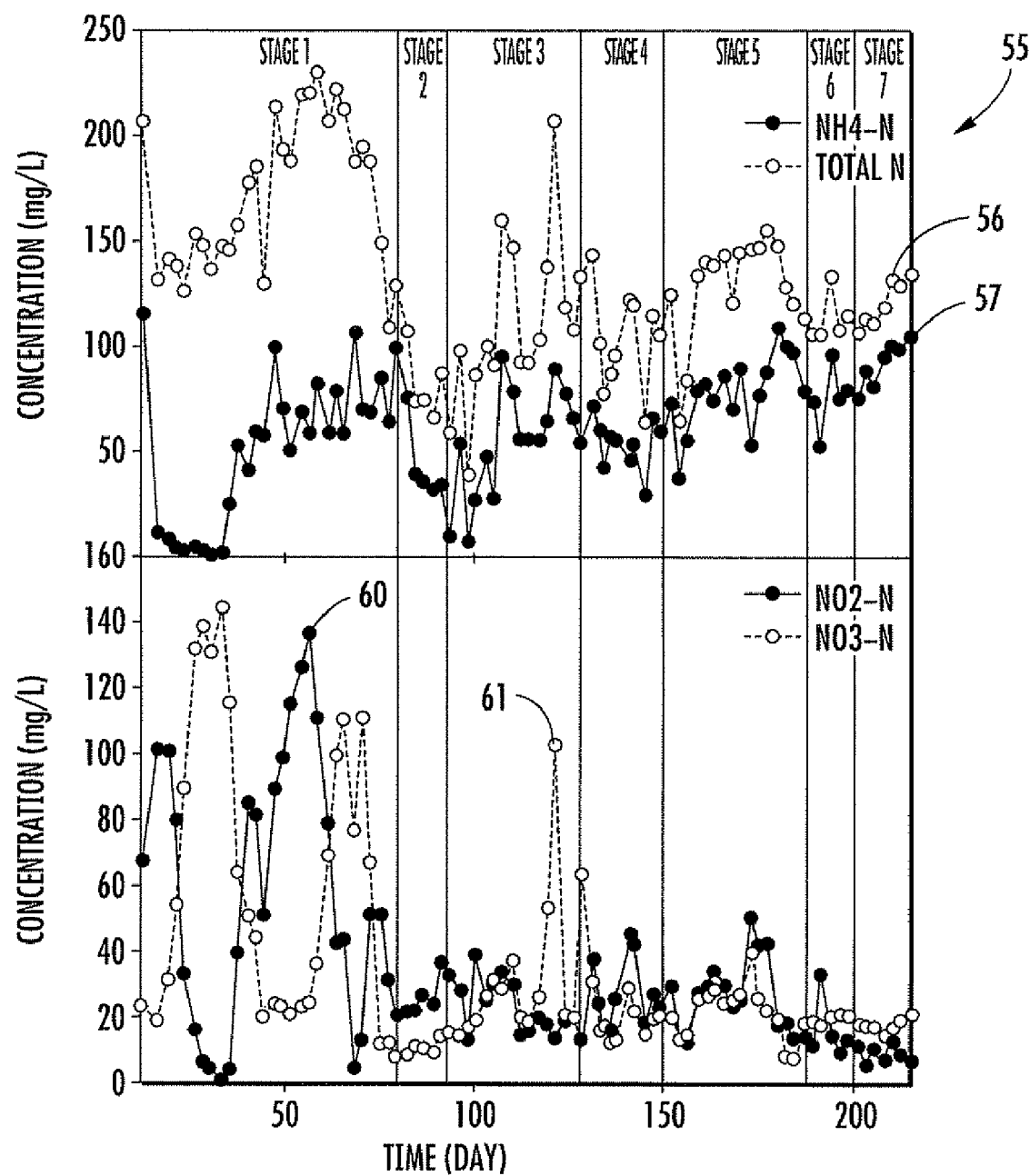
FIG. 5 is a diagram illustrating effluent concentrations of different Nitrogen ions during testing of the bioreactor according to the present invention.
Figure 6:
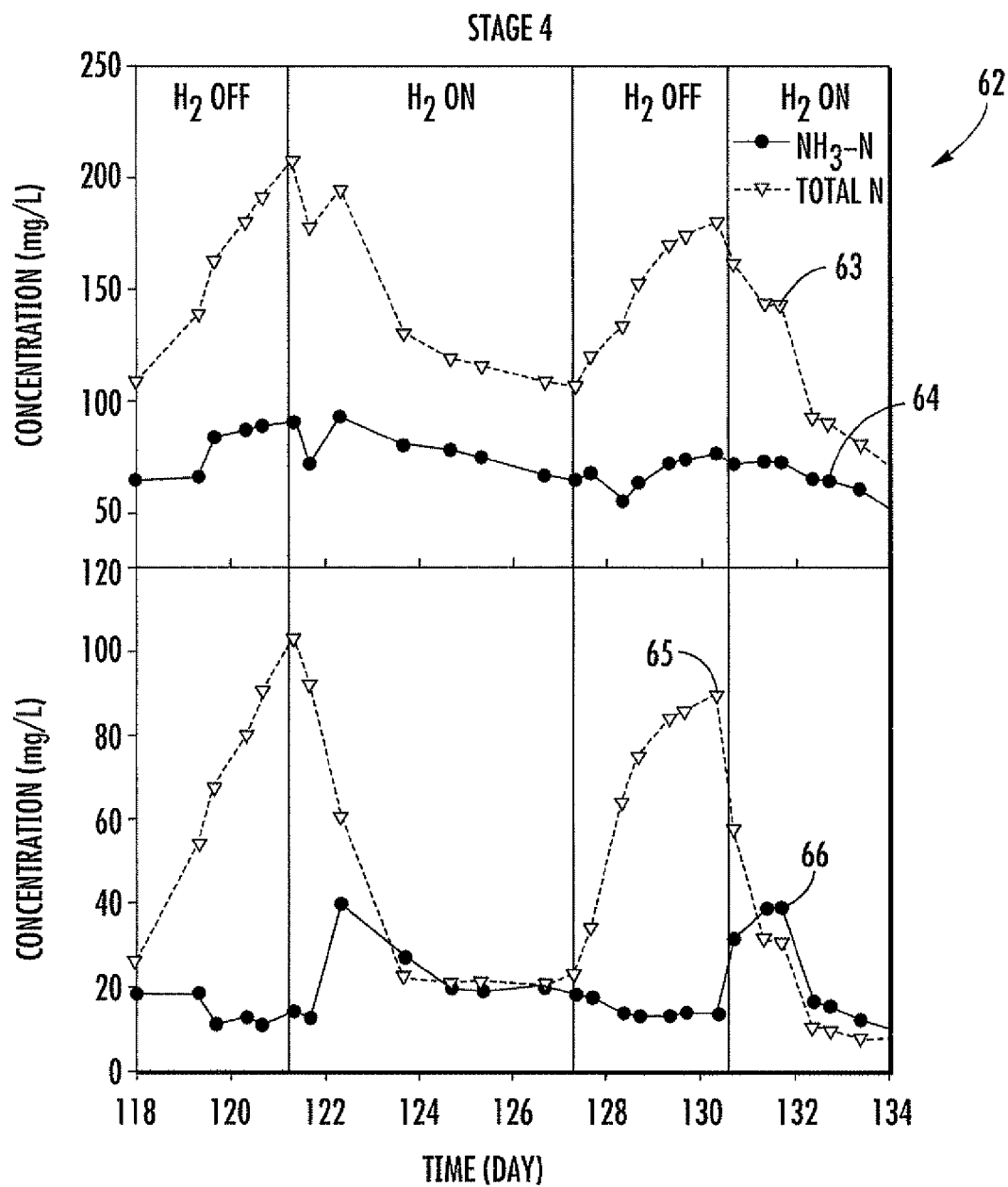
FIG. 6 is a diagram illustrating effluent concentrations of different Nitrogen ions during a portion of the testing of the bioreactor according to the present invention.

Stage 1: Nitrification Establishment (Day 1-68) The co-occurrence of autotrophic ammonia oxidation and Hydrogenotrophic denitrification was investigated. The initial operational approach was to establish relatively high ammonia processing rates to support the objective, rather than to produce an effluent with low concentrations of N ions. The bioreactor 20 was inoculated and operated on $O_2$ only for the first 68 days. The initial feed flow rate of 0.3 ml/min was increased to 1.0 on Day 34 and 1.5 ml/min on Day 43 in response to low $NH_4^+$—N levels in the effluent (FIG. 5). $NH_4^+$—N utilization flux increased greatly in response to the flow increase on Day 34, but less on Day 43 (FIG. 6). Referring specifically to FIG. 5, a diagram 55 illustrates effluent concentrations of different Nitrogen ions during testing of the bioreactor 20: $NH_4^+$—N 57, total Nitrogen 56, $NO_2^-$N 60, and $NO_3^-$N 61. Referring specifically to FIG. 6, a diagram 62 illustrates effluent concentrations of different Nitrogen ions during a portion of the testing of the bioreactor 20: $NH_3$—N 64, 66 and total Nitrogen 63, 65.

Figure 7:
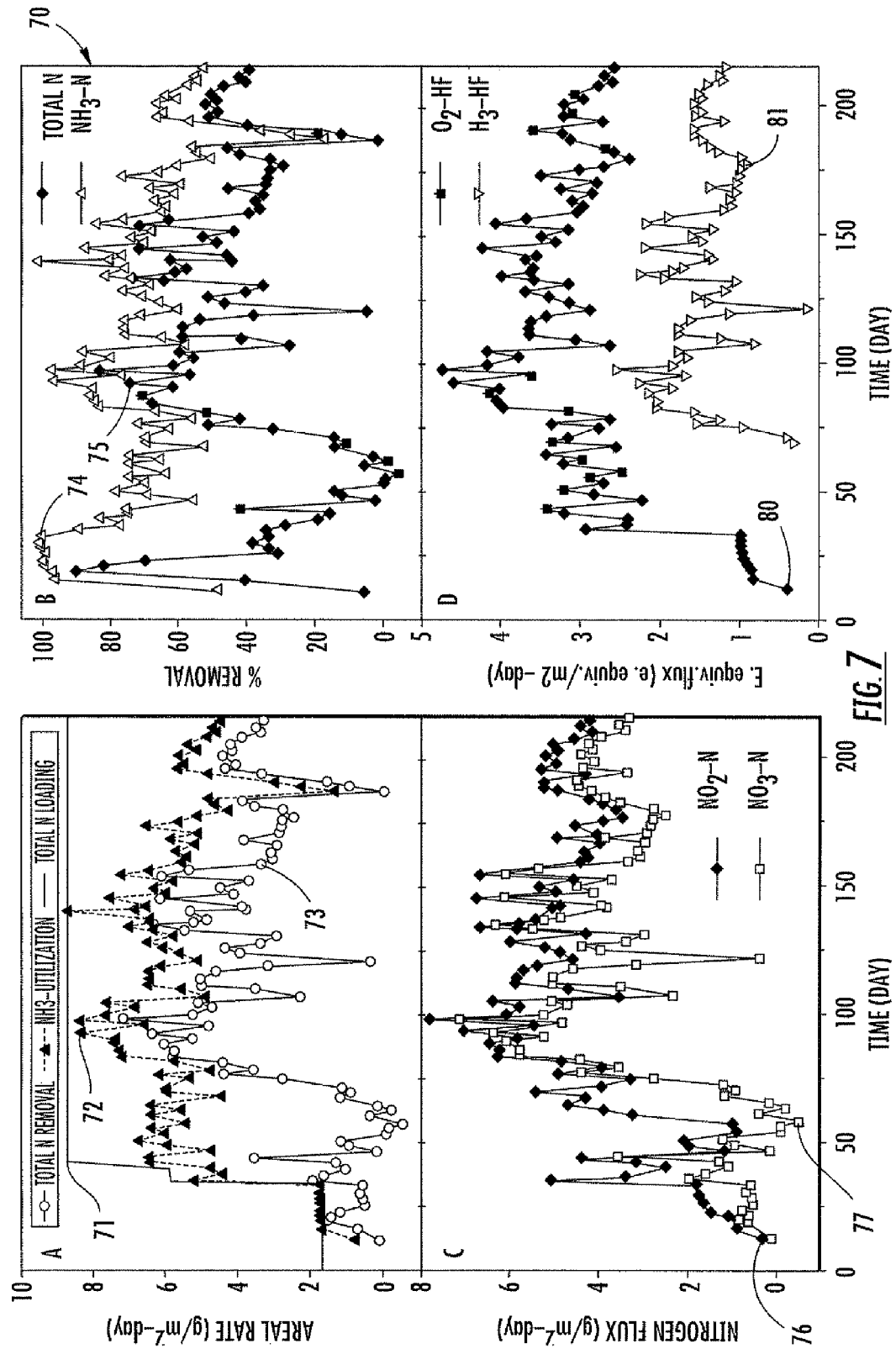
FIG. 7 is a diagram illustrating areal loading and removal, removal efficiency, oxidized nitrate and nitrite flux, and electron equivalent flux of $O_2$ and $H_2$ during the testing of the bioreactor according to the present invention.

$NO_2^-$—N accumulated during the first few weeks of the study and following the increases in loading rate (FIG. 5), reflecting slower establishment of the nitrite-oxidizing bacteria (NOB) compared to ammonia-oxidizing bacteria (AOB) From Day 56 to 69, decline in $NO_2^-$—N accompanied by increase in $NO_3^-$—N indicated that nitrification had been established (FIG. 5). From Day 43 to 69, effluent $NH_4^+$—N was 60 to 80 mg $L^{-2}$, percent $NH_4^+$—N removal was 70%, and removal flux of $NH_4^+$—N was 5 to 6 g $m^{-2}$ $day^{-1}$ (FIG. 7). While effluent oxidized Nitrogen shifted from nitrite to nitrate domination (FIG. 5), conversion of $NH_4^+$—N to oxidized Nitrogen remained stoichiometric.

Referring specifically to FIG. 7, a diagram 70 illustrating areal loading (total Nitrogen removal 73, total $NH_3$—N utilization 72, and total Nitrogen loading 71) and removal (total Nitrogen 75, and $NH_3$—N 74) efficiency, oxidized nitrate 77 and nitrite flux 76, and electron equivalent flux of $O_2$ 80 and $H_2$ 81 during the testing of the bioreactor 20.

Recovery of total inorganic Nitrogen was low during the first 50 days of operation, showing a low of 10% on Day 25 but increasing to 100% by Day 60. The initial poor recovery was unlikely to be due to either heterotrophic or Hydrogenotrophic denitrification given the lack of available carbon or $H_2$, respectively. Immobilization of Nitrogen into growing biofilm is another potential route, but a preliminary mass balance indicated that microbial synthesis was an unlikely route for appreciable Nitrogen removal in this autotrophic dominated system.

Protein measurements of the biofilms (see below) show that total N in microbial biomass within the reactor is ~0.5 g, so even during periods of rapid growth only a fraction of this amount could be immobilized in biomass. The loading rate of N to the reactor, on the other hand, ranged from 0.09-0.47 g $day^{-1}$ (i.e., areal $NH_3$—N loading rates from FIG. 7 adjusted for total $O_2$—HF surface area of 582 $cm^2$). A more likely source for N removal was denitrification of $NO_2^-$—N to $N_2O$ by ammonia oxidizing organisms, a commonly reported reaction under low $O_2$ and high $NO_2^-$—N levels. N recovery reached ~100% before $H_2$ supply was initiated, suggesting that once nitrite-oxidizing bacteria were established they out competed the AOB for $NO_2$—N.

Oxygen management was of great concern in prototype operation, and it was decided to establish low bulk dissolved Oxygen (DO) concentration as a prerequisite for the initiation of $H_2$ supply. The supply of Oxygen to $O_2$—HF was controlled by pressure in the inlet line leading to the HF distribution manifold. The initial inlet pressure of 2.0 psi resulted in DO of 50 mg $L^{-1}$ or greater for Days 1 through 33, when $NH_4^+$—N loading was 1.61 g $m^2$ $day^{-1}$. Decrease of inlet pressure to 0.23 psi and increase in loading rate on Day 34 reduced bulk DO to 12 mg $L^{-1}$. Further decreases in inlet $O_2$ pressure and loading increase on Day 43 led to non-detectable bulk DO after Day 51.

Stage 2: Initiation of Hydrogen Addition (Day 69-79) $H_2$ addition was initiated to the bioreactor 20 on Day 69, when ammonia removal was 50 to 60% (FIG. 7), nitrite was 5 mg/L or less, and nitrate accounted for the converted ammonia (FIG. 5). $NO_3^-$—N declined rapidly from 111 to 12.4 mg $L^{-1}$ within 5 days (FIG. 5). $NO_2^-$—N increased initially to ~50 mg $L^{-1}$, but declined to ~25 mg $L^{-1}$ by Day 79. From Day 75 to 79, average $NH_4^+$—N, $NO_2^-$—N and $NO_3^-$—N concentrations were 52, 27, and 18 mg $L^{-1}$, respectively, and average removal efficiency was 70% for $NH_4^+$—N and 55% for total inorganic Nitrogen (FIG. 5). The effect of $H_2$ addition on oxidized Nitrogen in the bioreactor 20 is further illustrated by comparing effluent levels and removal fluxes under operation with added $H_2$ to operation without $H_2$ on Days 63-68.

Hydrogen addition reduced nitrate concentration by over 80% (FIG. 7), and average $NO_3^-$—N flux from Day 75 to 79 was 4.42 g $m^{-2}$ $day^{-1}$, over 9 times greater than without $H_2$ (FIG. 7). The $H_2$ on condition was represented by Day 75-79, after the steep $NO_3$ decline but before liquid effluent recycle was discontinued. This five day period was relatively short and the bioreactor 20 had not fully stabilized, but the effects of $H_2$ addition on $NO_3^-$ also extended well into the following operational period, with similar operation except without liquid recycle.

While $NO_3$ rapidly decreased following the addition of $H_2$, a significant increase in $NO_2$ also resulted. It is possible that transport of $H_2$ to $O_2$ HF biofilms interfered with nitratation, such as, through use of Oxygen resources used by Hydrogen oxidizing organisms. Nitrite oxidation has been shown to be more sensitive than ammonia oxidation in limited Oxygen environments. Additionally, high nitrate concentrations, such as, existed in the bioreactor 20 just after the start of $H_2$ addition have been shown to inhibit Hydrogenotrophic nitrite reduction.

Stage 3: $H_2$ On/Liquid Recycle Off/On (Day 80-117) The effects of advective flow on bioreactor 20 performance could be both beneficial and adverse. Advective flow affects reactor bulk mixing, hydrodynamics and mass transfer. Higher flow rates could be beneficial by decreasing resistance to transport of ammonia from bulk liquid to $O_2$ HF biofilms, increasing removal rates. At the same time, bioreactor 20 performance could be adversely affected by mixing. In the bioreactor 20, transport of $H_2$ to $O_2$ HF could adversely affect aerobic biofilm processes and vice versa. This could occur if the rate of $H_2$ supply exceeded its consumption rate, leading to breakthrough into bulk liquid. High advective flow rates could accentuate this adverse process in the bioreactor 20.

Effluent recycle was turned off on Day 80, but $H_2$ addition and all other operating conditions were unchanged (Table 2). Effluent $NH_4^+$—N decreased to 30-40 $L^{-1}$ soon after liquid recycle flow was turned off, were 10 to 50 mg $L^{-1}$ for several weeks, and then increased to 50 to 100 mg $L^{-1}$ when recycle was restarted. $NO_2^-$—N and $NO_3^-$—N remained relatively unaffected. The bioreactor 20 performance under the $H_2$ on/recycle off operating regime was characterized using data from Day 84 to 105, the period of time after ammonia levels had declined but before recycle was turned back on. During this period, average (standard deviation) percent removal efficiencies for ammonia and total inorganic Nitrogen were 84 (6.6) and 66 (8.2), respectively. Effluent Nitrogen concentrations were 30 (9.2), 29 (4.2), and 20 (6.7) mg $L^{-1}$ for ammonia, nitrite and nitrate, respectively.

The decline in ammonia level when recycle was discontinued and the increase when recycle was restarted suggest that liquid recycle may have had some effect on nitritation rates. One potential explanation is that recycle was enhancing transport of excess $H_2$ to oxic biofilms, causing competition for Oxygen resources. Nitrite reduction is more Oxygen sensitive than ammonia, and nitrite levels did not substantially increase in Day 84 to 105. Another possible explanation is a direct physiological effect of $H_2$ on to ammonia oxidizing organisms. It may be recognized that the recycle off/on period and the preceding $H_2$ on operation (Day 69-79) were of relatively short duration and the bioreactor 20 would ideally have had more time to adapt to new operating conditions.

The bioreactor 20 operation from Day 80 through 117 continued the trend that was established following the introduction of $H_2$ on Day 69, showing that simultaneous supply of $O_2$ and $H_2$ resulted in significant declines in ammonia and total inorganic Nitrogen. For the period of Day 75 to 117, average removal efficiencies of ammonia and total inorganic Nitrogen were 76 and 55%, respectively, and average fluxes of $NH_4^+$—N and $(NO_3^-+NO_2^-)$—N were 6.1 and 4.4 g $m^2$ $day^{-1}$ respectively.

Stage 4: Hydrogen On/Off Experiments (Day 118-136) The bioreactor 20 supplied simultaneously with both $O_2$ and $H_2$ was achieving substantial reductions in total inorganic Nitrogen. Experiments were devised to definitively attribute the removal of oxidized Nitrogen to $H_2$ addition. The Hydrogen supply was deliberately discontinued and restarted two times, while all other operating conditions remained unchanged.

$NO_3^-$—N concentrations rose significantly for each 4 day period in which the gas supply to $H_2$—HF was zero. Following $NO3^-$—N rise, restarting $H_2$ led to rapid decline of $NO_3^-$—N to previous levels. The $H_2$ supply affected nitrate removal significantly and directly. The sudden cessation of $H_2$ supply affected $NO_2^-$—N relatively less than $NO_3^-$—N, suggesting that oxidation in $O_2$ HF biofilms was the significant nitrite transformation option under $O_2/H_2$ operation, or that nitrite metabolism could shift from reduction in $H_2$ HF biofilms to oxidation in $O_2$ HF biofilms.

Stage 5: Increased $O_2$ Inlet Pressure (Day 137-176) At the conclusion of the H2 on/off experiments, $NH_4^+$—N concentration was approximately 70 mg $L^{-1}$. Inlet $O_2$ pressure was increased to see if greater ammonia removal rates would result. Inlet $O_2$ pressure was increased from 0.18 to 0.40 psi on Day 137 and to 0.85 psi on Day 154. Overall, an increase in ammonia removal rates was not seen, and there was some tendency for ammonia to increase (FIG. 5). This suggests that the $O_2$ biofilms may have been limited in their capacity to assimilate greater $O_2$ supply. Increased $O_2$ inlet pressure did not appear to greatly affect nitrate and nitrite concentrations (FIG. 5). For the period of Day 137 to 176, average removal efficiencies of ammonia and total inorganic Nitrogen were 70 and 45%, respectively, and average fluxes of $NH_4^+$—N and $(NO_3^-+NO_2^-)$—N were 5.6 and 3.6 g $m^{-2}$ $day^{-1}$ respectively.

Stage 6: Increased $H_2$ Inlet Pressure (Day 177-190) The inlet pressure on the $H_2$ system was increased from 0.6 to 1.2 psi from Day 177 to 190, during which time $O_2$ pressure was maintained at 0.85 psi. The response was a continuation from previous operation of an increase in effluent $NH_4^+$—N concentration (FIG. 5) and decrease in $NH_4^+$—N removal flux (FIG. 7). Nitrate and nitrite declined during this period but the trend started before the increase in $H_2$ inlet pressure. For the period of Day 177 to 190, average removal efficiencies of ammonia and total inorganic Nitrogen were 49 and 31%, respectively, and average fluxes of $NH_4^+$—N and $(NO_3^-+NO_2^-)$—N were 3.9 and 2.5 g m$^2$ day$^{-1}$ respectively.

Stage 7: Constant $O_2/H_2$ Operation (Day 191-215) On Day 191, $H_2$ inlet pressure was reduced to 0.6 psi while all other operating conditions were unchanged. $NH_4^+$—N levels declined somewhat, no effect was seen on $NO_3^-$—N levels, and $NO_2^-$—N declined (FIG. 5). For Day 191 to 215, the average effluent concentration of $NH_4^+$—N was 84 mg L$^{-1}$ average effluent levels of $NO_2^-$—N and $NO_3^-$—N were only 8.2 and 18.3 mg L$^{-1}$, respectively. For the period of Day 191 to 215, average removal efficiencies of ammonia and total inorganic Nitrogen were 56 and 46%, respectively, and average fluxes of $NH_4^+$—N and $(NO_3^-+NO_2^-)$—N were 4.5 and 3.4 g m$^{-2}$ day$^{-1}$ respectively.

Section 6: Flux Calculations

The electron flux associated with nitrosyfication and nitrification reactions at $O_2$—HF biofilms and denitrification at $H_2$—HF biofilms was used as a measure of biofilm activity. Electron flux was calculated by assuming that all nitrite utilization is by oxidation at the $O_2$—HF. The average electron equivalents flux of $O_2$ was generally about twice that of $H_2$ (FIG. 7). The $O_2/H_2$ ratio is much greater on a mass basis because the e. equiv. mass of $O_2$ is eight times greater than that for $H_2$.

For the period between Day 75 and 177, average e. equiv. flux for $O_2$ was 2.1 times that of $H_2$ and mass flux was 17 times greater. From the starting point of $H_2$ addition at Day 70, biofilm activity was relatively consistent, with the exceptions being when $H_2$ was deliberately turned off (Day 121) and when increasing $H_2$ inlet pressure led to nitrification inhibition (Day 187). The operational resiliency of the bioreactor 20 was demonstrated by the rapid establishment of denitrification following the initial introduction of $H_2$, the quick return of $NO_3^-$—N to pre-existing levels when $H_2$ supply was discontinued and restarted, and the rapid increase in $NH_4^+$—N utilization when $H_2$ pressure was reduced on a Day 192. Considering that inlet pressure adjustment was a way to control the $O_2$ and $H_2$ Supplies, the operational performance of the bioreactor 20 process was quite consistent.

Figure 8:
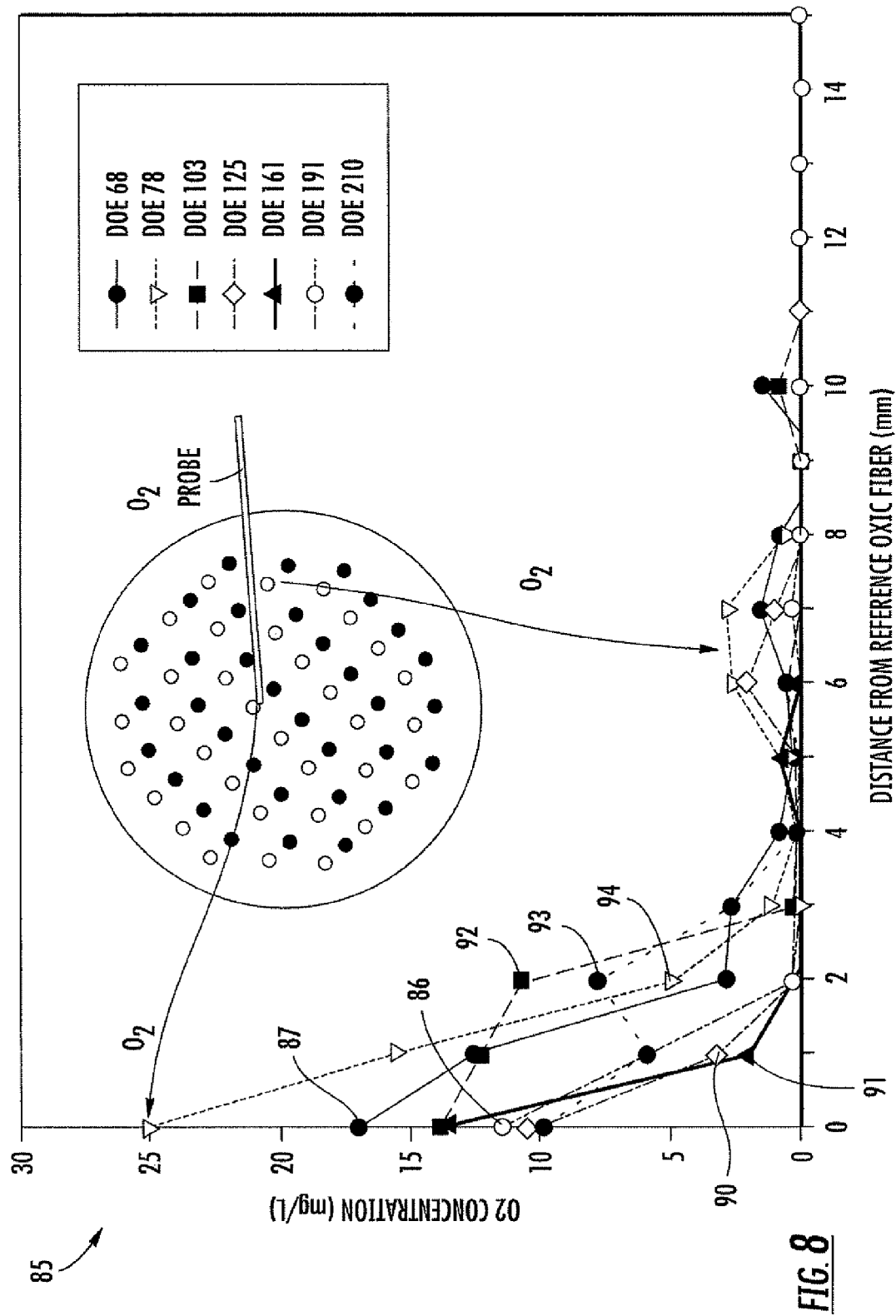
FIG. 8 is a diagram illustrating Oxygen profiles during the testing of the bioreactor according to the present invention.

Section 7: Dissolved Oxygen Profiling Referring specifically to FIG. 8, a diagram 85 illustrates Oxygen profiles during the testing of the bioreactor 20 (Day 68 87; Day 78 94; Day 103 92; Day 125 90; Day 161 91; Day 191 86; and Day 210 93). DO profiles were made along a transect across the bioreactor 20 hollow fiber field (FIG. 8). DO was low to zero across much of the fiber field, but a DO peak was consistently detected at a reference fiber near the center of the hollow fiber zone (FIG. 8). Highest DO levels at the peak were 9.5 to 25 mg L$^{-1}$, and are thought to be at locations where the tip of the Unisense DO probe tangentially or directly contacted the reference $O_2$ HF. Profiling revealed significant gradients in $O_2$ concentration at spatial scales on the order of 1 mm. Comparison of profiles at Day 68, when only $O_2$ was added to the bioreactor 20, versus Day 78 when $H_2$ was also added, indicates no great differences except for the higher peak on Day 78. The only profile obtained when effluent recycle was off was on Day 103; and it exhibits the highest DO at the 2 mm distance.

The presence of $O_2$ at 2 mm from the reference fiber suggested that dissolved Oxygen should be non-negligible in the bulk liquid. However, reactor effluent was generally quite low in DO (<0.3 mg L$^{-1}$). One possible speculation to explain this discrepancy is that radial concentration gradients may exist in the bioreactor 20 between the annular space surrounding the fiber zone and the fiber zone interior. Oxygen in the liquid in the interior of the fiber zone could be consumed at $H_2$ fibers and never leave the reactor.

Section 8: Biofilm Characterization

Biofilms from the $O_2$ fibers appeared to have slightly greater density (dry mass cm$^{-2}$ surface area) and greater number of cells per biofilm volume, although these results were not consistently different for all replicates, as shown in Table 3 below. Protein content per area was slightly higher in the $H_2$ biofilm, and % protein content on a dry mass basis was consistently greater. The lower % protein content of the $O_2$ biofilms, despite equivalent or slightly higher numbers of cells per biofilm surface area, suggests a larger amount of non-protein, extracellular material.

TABLE 3

Membrane Biofilm Characteristics

| Biofilm Characteristics | Hydrogen Biofilm | Oxygen Biofilm |
| --- | --- | --- |
| Dry mass (mg/cm$^2$) | 5.68 ± 1.81 | 6.59 ± 0.58 |
| Protein (mg/cm$^2$) | 0.69 ± 0.16 | 0.32 ± 0.22 |
| % protein (dry mass) | 9.84 ± 2.05 | 4.04 ± 0.63 |
| Total cells/mg (dry mass) | 2.54E11 ± 8.58 | 4.32E11 ± 3.11 |
| AOB response time (hours) | 29.08 ± 8.75 | 0.58 ± 0.08 |
| NOB response time (hours) | 37.75 ± 7.72 | 0.92 ± 0.08 |
| R2B response time (hours) | 0.50 ± 0.13 | 0.80 ± 0.11 |

Biofilm from the $O_2$ fibers consumed dissolved Oxygen in response to supplementation with both $NH_4^+$—N and $NO_2^-$—N compared to biofilms from the $H_2$ fibers, with minimum response times in the EDoxy assay of less than 1 h compared to 30-40 h for $H_2$—HF biofilms (Table 3). These results may confirm that the majority of AOB and NOB activity was associated with the oxic fibers. Both biofilms showed rapid $O_2$ consumption in response to the supplementation with organics (i.e., R2B), indicating that significant heterotrophic activity is associated with the autotrophic species on both the $O_2$ and $H_2$ fibers.

TABLE 4

Terminal Restriction Fragment Length Polymorphism Comparison of Bacterial Community Differences Between Gas Fibers

| Description | Fiber Type | Avg # Peaks[1] | Within Fiber Similarity (%)[2] | Between Fiber similarity (%)[3] |
| --- | --- | --- | --- | --- |
| Planctomycetes | $H_2$ | 2 | 100% | 0% |
| Planctomycetes | $O_2$ | 0 | ND[4] | |
| Nitrous oxide reductase | $H_2$ | 3 | 48% | 2.1% |
| Nitrous oxide reductase | $O_2$ | 7 | 70% | |

TABLE 4-continued

Terminal Restriction Fragment Length
Polymorphism Comparison of Bacterial Community
Differences Between Gas Fibers

| Description | Fiber Type | Avg # Peaks[1] | Within Fiber Similarity (%)[2] | Between Fiber similarity (%)[3] |
|---|---|---|---|---|
| Nitrobacter | $H_2$ | 11 | 67% | 0.7% |
| Nitrobacter | $O_2$ | 7 | 59% | |
| Nitrospira* | $H_2$ | 6 | 61% | 12.5% |
| Nitrospira* | $O_2$ | 28 | 57% | |
| Ammonia monooxygenase | $H_2$ | 1 | 56% | 6.6% |
| Ammonia monooxygenase | $O_2$ | 10 | 78% | |
| AOB β-proteobacteria | $H_2$ | 8 | 53% | 4.3% |
| AOB β-proteobacteria | $O_2$ | 15 | 58% | |

Since the TRFLP analysis is PCR based approach, these data (Table 4, show above) do not provide data on the relative density of the different types of organisms present on the fibers. Instead, the average number of peaks reflects the richness of different types of organisms present with the targeted gene, and the similarity in TRFL present reflect the equivalence in the types of organism present. Overall, the TRFLP data indicated a greater similarity amongst samples from the same type of fiber than from samples from different fibers, indicating that distinct biofilm communities developed on the juxtaposed fibers (Table 4). Ammonia-oxidizing (as detected by the amoA gene) and nitrite oxidizing bacteria (as detected by markers for Nitrospira and Nitrobacter) were found on both types of fibers, but the richness of both ammonia oxidizers and Nitroispira were much greater on the oxic fibers.

The presence of the nitrifiers on the $H_2$ fibers is supported by the lower, yet detectable, levels of both ammonia and nitrite oxidizing activity on these fibers detected in the BDOxy assay. The low level of similarity in the nitrifiers present on the different types of fibers, particularly for the nitrite oxidizers for which the number of peaks were substantial for both types of fibers, suggest that distinct types of nitrifiers resided on the $O_2$ ands $H_2$ fibers. The presence of the functional gene indicative of denitrification (nitrous oxide reductase) on the $O_2$ fibers is not surprising given the detectable level of heterotrophic activity detected on these fibers in the BDOxy assay and the facultative nature of many denitrifiers. The low level of similarity in the TRFLP profiles between fibers; however, suggest that distinctive denitrifying populations reside on the juxtaposed fibers. The genes marker for anaerobic ammonia oxidizers was limited to the $H_2$ fibers, although their presence does not necessarily indicate a major functional role in the system.

While molecular markers for Hydrogenotrophic denitrifiers (e.g., Hydrogenases) were not utilized in this study, the rapid changes in $NO_3$ levels observed in response to $H_2$ flow support the important role of Hydrogenotrophic denitirification, rather than anaerobic ammonia oxidation, on the $H_2$ fibers. All NOB and AOB targeted by FISH were present in the biofilm growing on the Oxygen fiber, revealing large clusters of intermingled microcolonies. At the fiber substratum, none of the targeted AOB or NOB were present and in fact only some individual cells of AOB were observed at the interface of the biofilm with the bulk liquid. This correlates with the low level of activity (slow ammonia and nitrite oxidizing response time in the BD oxy assay) present in the Hydrogenotrophic biofilms.

The association of the NOB and AOB appeared to differ through the depth of the biofilms from the $O_2$ fibers. In the section closest to the Oxygen fiber substratum, microcolonies of Nitrospira and Nitrobacter were closely associated with AOB. The middle of the biofilm was dominated by large clusters of densely packed AOB with some NOB present. The structure at the top of the aerobic biofilm consisted of loosely associated populations of AOB and NOB present in lower numbers and either single cell or small microcolony stuctures. The weak staining with the AOB and NOB probes in this region suggests a relative dominance of non-nitrifiers, for example, heterotrophs using either $O_2$ or NO3 as a terminal electron acceptor and carbon derived from nitrifiers as an energy source.

Section 9: Conclusions

A new biofilm reactor design (Redox Control Bioreactor) was developed to explore the hypothesis that ammonia oxidation and autoHydrogenotrophic denitrification could co-occur within a single hollow fiber membrane bioreactor supplied with $O_2$ and $H_2$ on separate, spatially juxtaposed hollow fibers. A prototype bioreactor 20 receiving 217 mg $L^{-1}$ ammonia Nitrogen achieved steady ammonia Nitrogen removal flux of 5.8 g $m^{-2}$ $day^{-1}$ normalized to $O_2$ HF surface area, while at the same time removing oxidized inorganic Nitrogen (nitrate plus nitrite) at a surface rate of 4.4 g $m^{-2}$ $day^{-1}$. Structural and functional differentiation between $O_2$- and $H_2$-supplied hollow fiber biofilms was supported by oxytrophic activity analyses, molecular characterization, and the steep Oxygen gradients in the vicinity of $O_2$-supplied HF. Calculated nitrification and denitrification fluxes in the bioreactor 20 were as high or higher than fluxes previously reported for HF bioreactors receiving only $O_2$ or only $H_2$, though the usefulness of flux comparison between highly different systems is limited.

The bioreactor 20 performance in some cases appeared to be affected by the rate of $H_2$ supply and mixing energy in the bulk liquid. Previous HFMBR studies have demonstrated highly efficient $H_2$ utilization (~transfer efficiency) with little gas breakthrough into bulk fluid. This HFMBR feature is shared by the bioreactor 20, where both $O_2$ and $H_2$ may be supplied at rates that support biofilm reactions at their respective fiber surfaces but do not inhibit reactions at the other.

The bioreactor 20 may be most applicable for treatment of feed streams with low carbon to Nitrogen ratios that require both oxidation and reduction reactions. In this case, use of a single bioreactor 20 could eliminate the need for more than one unit process, and may reduce or remove the need for active pH control or addition of pH buffers. Waste streams with higher levels of biodegradable organic carbons could at some point overwhelm bioreactor 20 function and might be better treated using pre-denitrification.

In this case the bioreactor 20 could serve as a post-treatment, but the carbon levels needed to insure effective bioreactor 20 function have not been established. Along this line, the bioreactor 20 may be suitable for treating for lower levels of total inorganic Nitrogen. In this study, bioreactor 20 effluent contained 30 to 100 mg $L^{-1}$ $NH_4^+$—N and 10 to 30 mg $L^{-1}$ $NO_3^-$—N and $NO_2^-$N, which is one factor that resulted in high fluxes.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of treating a fluid stream comprising:
passing the fluid stream through a bioreaction chamber;
flowing a first gas through a first plurality of hollow fiber membranes (HFMs) within the bioreaction chamber while the fluid stream is passing therethrough; and
flowing a second different gas through a second plurality of HFMs within the bioreaction chamber also while the fluid stream is passing therethrough.

2. The method according to claim 1 wherein flowing the first and second gasses comprises flowing the first and second gasses through a pair of spaced apart gas header assemblies.

3. The method according to claim 1 wherein flowing the first gas and the second gas comprises simultaneously flowing the first and second gases.

4. The method according to claim 1 wherein the bioreaction chamber has a cylindrical shape defining an axis; and wherein the first and second pluralities of HEFMs extend parallel to the axis.

5. The method according to claim 1 wherein the first gas comprises an oxidizing gas; and wherein the second gas comprises a reducing gas.

6. The method according to claim 5 wherein the first gas comprises Oxygen; and wherein the second gas comprises Hydrogen.

7. The method according to claim 1 further comprising forming a biofilm covering outer surfaces of the plurality of first and second HFMs.

8. A bioreactor for processing a fluid stream comprising:
a bioreaction chamber for receiving the fluid stream therethrough;
a pair of spaced apart gas header assemblies within said bioreaction chamber for coupling to first and second gases;
a first plurality of hollow fiber membranes (HFMs) extending between said pair of gas header assemblies for introducing the first gas into the fluid stream within said bioreaction chamber; and
a second plurality of HEMs extending between said pair of gas header assemblies for introducing the second gas into the fluid stream within said bioreaction chamber.

9. The bioreactor according to claim 8 wherein each gas header assembly comprises an inner gas header, and an outer gas header adjacent thereto.

10. The bioreactor according to claim 9 wherein said inner gas header comprises an inner header body having an inner gas chamber therein, a plurality of inner blind holes terminating respective HFMs to be in fluid communication with said inner gas chamber, and a plurality of through holes receiving therethrough other respective HFMs.

11. The bioreactor according to claim 10 wherein said outer gas header comprises an outer header body having an outer gas chamber, and a plurality of outer blind holes terminating respective HFMs to be in fluid communication with said outer gas chamber.

12. The bioreactor according to claim 10 wherein said inner gas header further comprises an inner gas port coupled in fluid communication with said inner gas chamber and extending through said bioreaction chamber.

13. The bioreactor according to claim 11 wherein said outer gas header further comprises an outer gas port coupled in fluid communication with said outer gas chamber and extending through said bioreaction chamber.

14. The bioreactor according to claim 8 wherein said bioreaction chamber has a cylindrical shape defining an axis; and wherein said first and second pluralities of HFMs extend parallel to the axis.

15. The bioreactor according to claim 8 further comprising a first gas source for the first gas; and wherein the first gas comprises an oxidizing gas.

16. The bioreactor according to claim 15 further comprising a second gas source for the second gas; and wherein the second gas comprises a reducing gas.

17. The bioreactor according to claim 16 wherein the first gas comprises Oxygen; and wherein the second gas comprises Hydrogen.

18. The bioreactor according to claim 1 wherein each of said plurality of first and second HFMs comprises a silicone elastomer HFM.

19. The bioreactor according to claim 1 further comprising a biofilm covering outer surfaces of said plurality of first and second HFMs.

20. A bioreactor for processing a fluid stream comprising:
a bioreaction chamber for receiving the fluid stream therethrough;
an oxidizing gas source for an oxidizing gas;
a reducing gas source for a reducing gas;
a pair of spaced apart gas header assemblies within said bioreaction chamber coupled in fluid communication with said oxidizing and reducing gas sources;
a first plurality of hollow fiber membranes (HFMs) extending between said pair of gas header assemblies for introducing the oxidizing gas into the fluid stream within said bioreaction chamber; and
a second plurality of HFMs extending in parallel with said first plurality of HFMs and between said pair of gas header assemblies for introducing the reducing gas into the fluid stream within said bioreaction chamber.

21. The bioreactor according to claim 20 wherein each gas header assembly comprises an inner gas header, and an outer gas header adjacent thereto.

22. The bioreactor according to claim 21 wherein said inner gas header comprises an inner header body having an inner gas chamber therein, a plurality of inner blind holes terminating respective HEMs to be in fluid communication with said inner gas chamber, and a plurality of through holes receiving therethrough other respective HFMs.

23. The bioreactor according to claim 22 wherein said outer gas header comprises an outer header body having an outer gas chamber, and a plurality of outer blind holes terminating respective HFMs to be in fluid communication with said outer gas chamber.

24. The bioreactor according to claim 20 wherein said bioreaction chamber has a cylindrical shape defining an axis; and wherein said first and second pluralities of HFMs extend parallel to the axis.

* * * * *